No. 771,134. PATENTED SEPT. 27, 1904.
F. ERICKSON.
COMBINED TRUCK AND SHOVEL.
APPLICATION FILED JAN. 16, 1904.
NO MODEL.
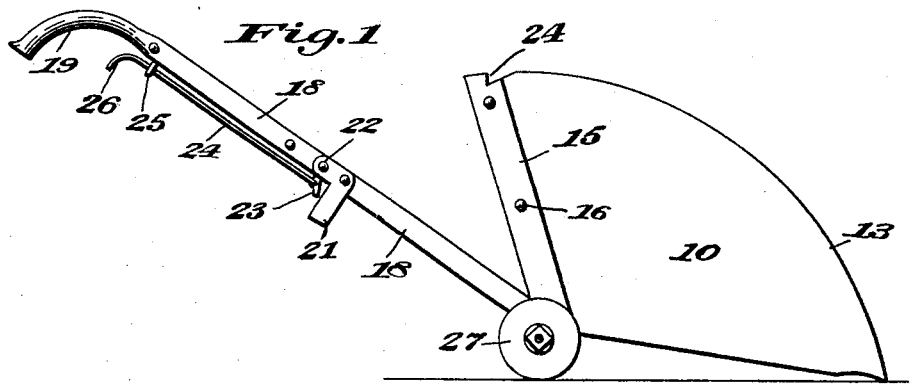
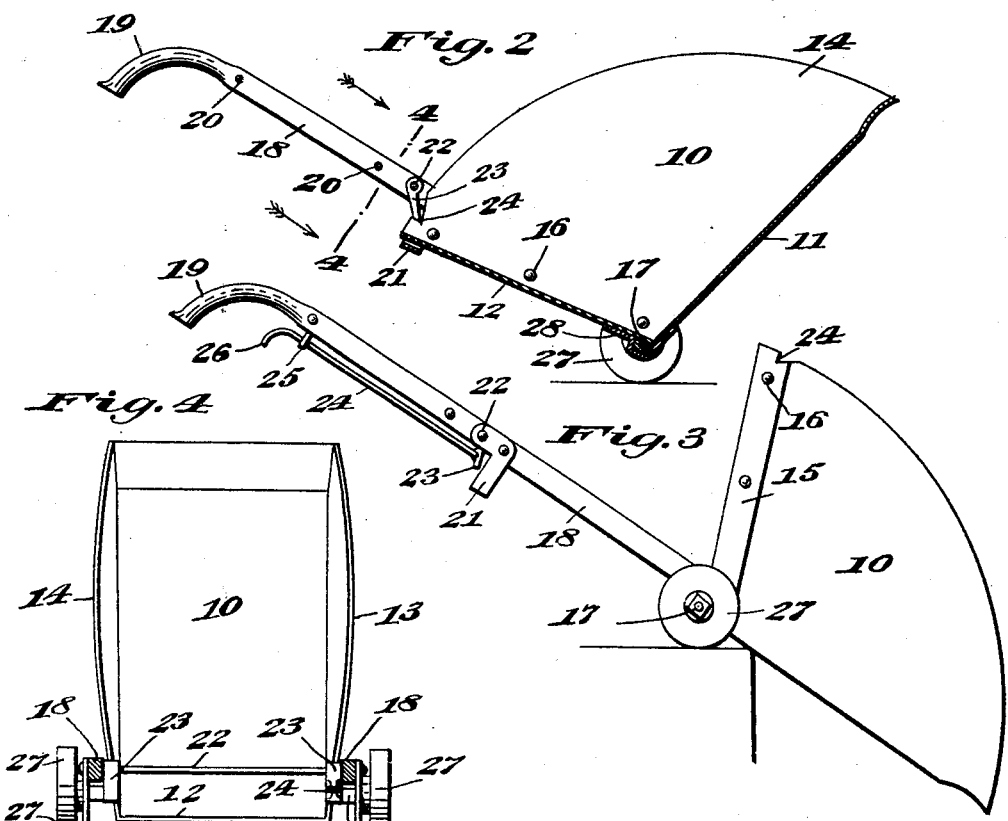

No. 771,134. Patented September 27, 1904.

UNITED STATES PATENT OFFICE.

FRANK ERICKSON, OF EVELETH, MINNESOTA.

COMBINED TRUCK AND SHOVEL.

SPECIFICATION forming part of Letters Patent No. 771,134, dated September 27, 1904.

Application filed January 16, 1904. Serial No. 189,298. (No model.)

*To all whom it may concern:*

Be it known that I, FRANK ERICKSON, a citizen of the United States, residing at Eveleth, in the county of St. Louis and State of Minnesota, have invented certain new and useful Improvements in a Combined Truck and Shovel, of which the following is a specification.

This invention relates to improvements in a device to be used for handling or transferring all kinds of grain, potatoes, hard coal, sand, gravel, lime, and other material from one point to another, and is especially adapted for use in loading and unloading cars at docks; and it consists in certain peculiarities of the construction, novel arrangement, and operation of the various parts thereof, as will be hereinafter more fully set forth and specifically claimed.

The principal object of the invention is to provide a combined truck and shovel or scoop to be used for the above-named purposes which shall be simple and inexpensive in construction, strong and durable, and so made as to facilitate the operation of moving grain, coal, and the like.

Another object is to construct the device in such a manner that it can be used for quickly moving the material from one point to another nearby, (as when an ordinary shovel is employed,) or it may be used for conveying the material to a more distant point, where it can be automatically dumped.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a view in side elevation of a combined truck and shovel embodying my invention, showing the parts in the positions they will assume when the device is being used for scooping up the material. Fig. 2 is a view, partly in elevation and partly in section, showing the scoop or shovel raised and the parts in position for trundling the load of material carried thereby. Fig. 3 is a view in side elevation, showing the parts in the positions they will assume when the load is being dumped from the shovel, and Fig. 4 is a view, partly in section and partly in elevation, taken on line 4.4 of Fig. 2 looking in the direction indicated by the arrows, showing the truck-frame lowered.

Like numerals of reference refer to corresponding parts throughout the different views of the drawings.

The shovel or scoop 10 may be made of any suitable size, form, and material, but preferably of sheet metal, and substantially triangular in cross-section, as is clearly shown in the different views of the drawings—that is to say, it comprises a receptacle having the front 11 and rear portion 12, forming its bottom, at an angle to each other. Secured to the sides of the portions 11 and 12 are upwardly-extending sides 13 and 14, which may be made integral with the front portion of the bottom of the shovel or scoop and secured to upturned flanges 15 on the rear portion 12 of the bottom by means of rivets 16 or otherwise. The shovel is mounted near the apex or angle of its bottom on the axle 17 of the truck-frame, which comprises two parallel side pieces 18, having at their upper ends handles 19, by means of which the device is propelled or operated. The sides 18 of the truck-frame are secured together by transversely-extending tie-rods 20 and a brace-bar 21, which also extends crosswise of the truck-frame and depends downwardly therefrom, so as to form a check to restrict the rearward movement of the shovel. Extending from one of the sides 18 of the truck-frame to the other and located just above the brace-bar 21 is a rod 22, on which is non-rotatably mounted near each of its ends, but usually between the side pieces 18, a dog or detent 23 to engage the recesses 24 in the upper rear portion of the sides 13 and 14 of the shovel. Loosely connected at one of its ends to one of the dogs or detents 23 is a releasing-rod 24, which is loosely supported on one of the sides 18 of the truck-frame by means of a guide-ring 25 and has its other end curved to form a handle 26, by means of which it may be moved toward one of the handles 19 of the truck-frame, thus disengaging the dogs 23 from the recesses in the shovel. Mounted on each end of the axle 17 is a wheel 27 of any suitable size and material.

From the foregoing and by reference to the drawings it will be readily seen and clearly understood that by placing the parts in about the positions shown in Fig. 1 the shovel may be pushed forward, so as to scoop up or load the same with grain or other material, when the truck-frame may be raised to about a vertical position, at which time the dogs 23 will engage the catches 24 in the rear upper portion of the shovel, when by again turning or lowering the truck-frame to about the position shown in Fig. 2 it is apparent that the load carried by the shovel may be trundled to a point more or less distant from the receiving-point and there automatically dumped by simply releasing the dogs 23 from the recesses 24 in the shovel, which may be done by moving the releasing-rod 24 toward one of the handles 19 of the truck-frame.

By reference to Fig. 2 of the drawings it will be seen that the shovel 10 is non-rotatably secured on the axle 17 by means of straps 28, which are located near the sides of the shovel and are secured at their ends to the front and rear portions of its bottom, thus extending partially around the axle, which at this point is usually rectangular in cross-section.

By reference to the drawings it will be seen that the front portion of the bottom of the shovel is longer than the rear portion thereof and that when the dogs 23 are released from the shovel the front portion of the same will overbalance the rear portion, thus causing it to dump automatically.

Having thus fully described my invention, what I claim as new, and desire to secure by Letters Patent, is—

1. The combination with a truck, of a shovel angular in form and mounted near its angle on the axle of the truck, a brace-bar transversely located on the truck-frame and depending from the lower surface thereof between its sides to restrict the rearward movement of the shovel, a dog pivotally mounted on the truck-frame above said bar to engage the rear portion of the shovel, and a releasing-rod movably mounted on the truck-frame and loosely connected at one of its ends to said dog, substantially as described.

2. The combination with a truck-frame, of an axle mounted on its lower end, and having angular portions near its ends, wheels rotatably mounted on the ends of the axle, a shovel angular in form and mounted near its angle on the axle of the truck, straps having angular bends to receive the angular portions of the axle and secured to the lower surface of the shovel, a brace-bar transversely located on the truck-frame and depending from the lower surface thereof between its sides to restrict the rearward movement of the shovel, a rod transversely located on the truck-frame above said bar, a dog mounted on said rod near each of its ends to engage the rear portion of the shovel, and a releasing-rod connected at one of its ends to one of the dogs and loosely mounted on the truck-frame, substantially as described.

FRANK ERICKSON.

Witnesses:
JOHN J. NEURUIK,
WILLIAM JOHNSON.